United States Patent
Povalyayev et al.

(10) Patent No.: US 11,372,898 B2
(45) Date of Patent: *Jun. 28, 2022

(54) SECURITY OF A COMPUTER SYSTEM

(71) Applicant: SAP SE, Walldorf (DE)

(72) Inventors: Viktor Povalyayev, Palo Alto, CA (US); David C. Hu, Palo Alto, CA (US); Marvin Baumgart, Palo Alto, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/036,998

(22) Filed: Sep. 29, 2020

(65) Prior Publication Data

US 2021/0011931 A1 Jan. 14, 2021

Related U.S. Application Data

(63) Continuation of application No. 15/638,435, filed on Jun. 30, 2017, now Pat. No. 10,831,787.

(51) Int. Cl.
| | |
|---|---|
| *G06F 16/28* | (2019.01) |
| *G06F 21/62* | (2013.01) |
| *G06F 21/60* | (2013.01) |
| *G06F 16/22* | (2019.01) |
| *G06T 11/20* | (2006.01) |

(52) U.S. Cl.
CPC ........ *G06F 16/285* (2019.01); *G06F 16/2237* (2019.01); *G06F 21/604* (2013.01); *G06F 21/6218* (2013.01); *G06T 11/206* (2013.01); *G06F 16/288* (2019.01); *G06F 2221/2141* (2013.01)

(58) Field of Classification Search
None
See application file for complete search history.

(56) References Cited

U.S. PATENT DOCUMENTS

| | | | |
|---|---|---|---|
| 10,831,787 B2* | 11/2020 | Povalyayev | G06F 21/604 |
| 2002/0087567 A1* | 7/2002 | Spiegler | G06F 16/284 |
| 2005/0182773 A1* | 8/2005 | Feinsmith | G06Q 10/10 |
| 2013/0013603 A1* | 1/2013 | Parker | G06F 16/353 |
| | | | 707/737 |

(Continued)

*Primary Examiner* — Wilson Lee
(74) *Attorney, Agent, or Firm* — Buckley, Maschoff & Talwalkar LLC

(57) ABSTRACT

Structure data is received from a database. The structured data may comprise data values and specifying relationships among the data values. A method is provided to include receiving selections of operations to be performed on the structured data and an order of the operations. The operations may include at least one permutation operation. The method may include determining a graphically displayable data format based on the selections of operations. The method may include representing the structured data and the relationships among the data values in the graphically displayable data format. The method may comprise performing operations according to the selections, including, permuting entries of the graphically displayable data format. The permuting may comprise bringing the entries of the graphically displayable data format into a logical order while maintaining the relationships. The method may also include displaying the entries for analysis after performing the operations.

20 Claims, 13 Drawing Sheets

(56) References Cited

U.S. PATENT DOCUMENTS

| | | | |
|---|---|---|---|
| 2016/0004963 A1* | 1/2016 | Hasegawa | G06N 3/088 |
| | | | 706/25 |
| 2016/0063422 A1* | 3/2016 | Chen | G06Q 10/067 |
| | | | 705/7.26 |
| 2017/0235848 A1* | 8/2017 | Van Dusen | G06F 30/20 |
| | | | 705/12 |
| 2018/0006791 A1* | 1/2018 | Marinier | H04L 5/0055 |
| 2018/0268341 A1* | 9/2018 | Rini | G06Q 10/06398 |
| 2018/0359420 A1* | 12/2018 | Kuchnio | H04N 5/23267 |

* cited by examiner

SECURITY OF A COMPUTER SYSTEM

CROSS-REFERENCE TO RELATED APPLICATION

This is a continuation of prior U.S. patent application Ser. No. 15/638,435, filed on Jun. 30, 2017, entitled "IMPROVING THE SECURITY OF A COMPUTER SYSTEM", the contents of which are hereby incorporated herein by reference in its entirety for all purposes.

FIELD

The field generally relates to data processing, analyzing structured data, and data analysis systems. More particularly, aspects disclosed in the present application relate to analyzing structured data in order to identify ways to improve the security of a computer system.

BACKGROUND

It is often desirable to extract and analyze data stored in a database in various ways. For example, analysis of data regarding access control for a computer system may lead to the identification of ways to improve the security of the computer system.

According to some conventional approaches, in order to perform data analysis, the data extracted from the database is sent to an external system (e.g., server) for processing. The processing may be carried out via a database application external to the database. Sending data to the external system may involve copying the data from the database to a magnetic storage medium, such as a hard disk, or sending the data over a network. Also, since the application code responsible for carrying out or facilitating the data analysis might not have access to the memory (e.g., random-access memory (RAM)) of the database, parallelization (e.g., via multi-threading) of the analysis processing (e.g., with other processing on the computer system such as database processing) is not possible.

SUMMARY

According to an aspect, a method is provided. The method may include receiving structured data from a database. The structured data may comprise data values and relationships among the data values. The method may also include receiving selections of operations to be performed on the structured data and an order of the operations. The operations may include at least one permutation operation. The method may also include determining a graphically displayable data format based on the selections of operations. The method may also include representing the structured data and the relationships among the data values in the graphically displayable data format. The method may also comprise performing operations according to the selections, including, permuting entries of the graphically displayable data format. The permuting may comprise bringing the entries of the graphically displayable data format into a logical order while maintaining the relationships. The method may also include displaying the entries for analysis after performing the operations.

According to another aspect, a computer program product is provided. The product may be tangibly embodied on a non-transitory computer readable storage medium. The product may comprise instructions that, when executed by at least one processor, cause the processor to receive structured data from a database, the structured data comprising data values and specifying relationships among the data values. The instructions may also cause the processor to receive selections of operations to be performed on the structured data and an order of the operations, wherein the operations include at least one permutation operation. The instructions may also cause the processor to determine a graphically displayable data format based on the selection of operations. The instructions may also cause the processor to represent the structured data and the relationships among the data values in the graphically displayable data format. The instructions may also cause the processor to perform operations according to the selections, including, permuting entries of the graphically displayable format. The permuting may comprise bringing the entries of the graphically displayable format into a logical order while maintaining the relationships. The instructions may also cause the processor to display the entries for analysis after performing the operations.

According to yet another aspect, a system is provided. The system may include instructions recorded on a non-transitory computer readable medium and executable by at least one processor. The system may comprise a database to store structured data. The system may further comprise a graphical user interface (GUI). The system may further comprise an application server to receive structured data from the database. The structured data may comprise data values and specify relationships among the data values. Further, the application server may receive selections of operations to be performed on the structured data and an order of the operations, wherein the operations include at least one permutation operation. Further, the application server may determine a graphically displayable data format based on the selection of operations. Further, the application server may represent the structured data and the relationships among the data values in the graphically displayable data format. Further, the application server may perform operations according to the selections, including, permuting entries of the graphically displayable data format. The permuting may comprise bringing the entries of the matrix into a logical order while maintaining the relationships. Further, the application server may send the entries to the GUI for display and analysis after performing the operations. The GUI may receive and display the entries.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Figure 1:
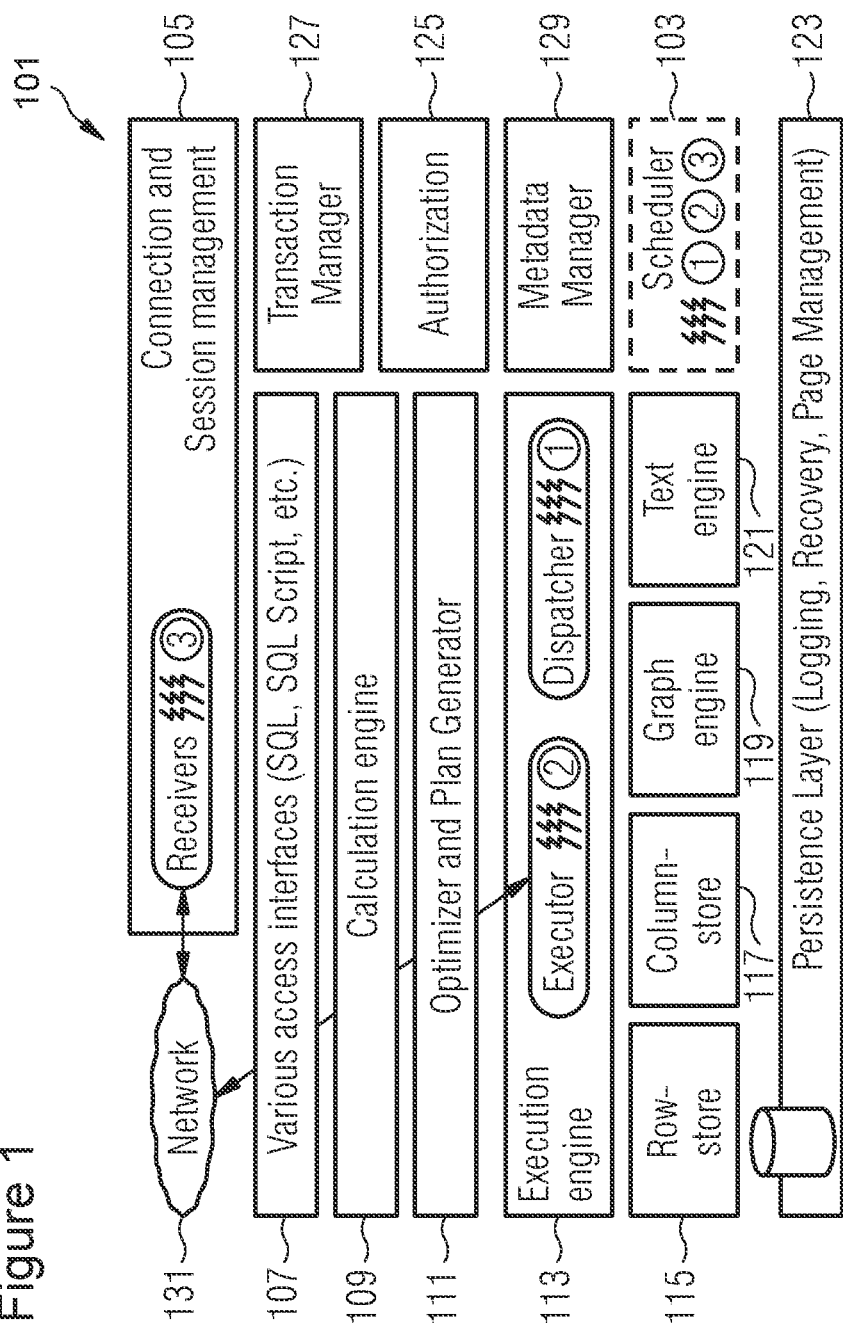
FIG. 1 is a block diagram illustrating an architecture of a database in which a method according to an embodiment may be executed.

Embodiments of techniques for improving the security of a computer system are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Copying data for data analysis onto a disk or transmitting the data over a computer network may incur a significant performance penalty. Further, such processing may be carried out using the Java programming language, which might not be as efficient as other programming languages (e.g., C or C++).

In addition to improved performance, another advantage of avoiding copying data to an external system (e.g., over a computer network) is improved security of data. Any network traffic could be accessed and/or modified by an attacker or malicious user.

Furthermore, by avoiding the copying of data to an external system, the amount of code required to process the data may be reduced, possibly to a significant extent. Reducing the code needed to process data reduces code maintenance requirements and makes it easier to modify/update existing code due to its reduced complexity.

Less code may be needed because commands to issue a persistence call (from Java for instance) are not needed, since the data can be modified directly instead of an issuing of data modification. For example, according to conventional approaches, to create a table mapping from an external Java server to the local database management system (DBMS), it may be necessary to construct a Java Persistence API (JPA) entity that lists every table column. If someone modifies the table, which may happen frequently, the JPA entity needs to be adjusted as well.

In addition, it may be desirable to provide a generic data structure or format for representing data in the database. Such a data structure may enable the data to be processed efficiently during analysis and, more particularly, facilitate performance of permutation (i.e. ordering, reordering, or rearranging) the data. Such a generic data structure may also facilitate visualizing the data for analysis.

Technical Definitions

Structured data may be organized according to a data model, such as a database model, an entity relationship model or a semantic data model. The structured data may consist of data values. The data model may organize the data values of the structured data and standardize how they relate to one another, and possibly how they relate to properties of real world entities. Structured data may be contrasted with unstructured data that does not have a predefined data model or is not organized in a predefined manner, e.g., a plain text file. The structured data may be organized according to a relational model or an object oriented model. Other data models or database models are also possible.

Data values may also be referred to as entities or data elements.

Relationships may be associations among or between data values.

A matrix may be a rectangular array of numbers or objects. The matrix may have rows and columns. The rows and columns may both be referred to as dimensions. For example, a matrix may have m rows and n columns, or m rows in a first dimension and n columns in a second dimension. Each row or column of the matrix may also be referred to as a line or vector.

A graphically displayable data format may be a binary array, plot graph, scatter graph, pie, bar or any other diagram identifiable as a suitable way to visualize the structured data.

The binary array may also be referred to as a bit array, bit map or Boolean array. The binary array is an array of binary values. The binary array may have entries from the Boolean domain $B=\{0,1\}$. For example, each of the entries of the binary array may have a first value of 0 or a second value of 1. Alternatively, each of the entries of the binary array may have a first value of 1 and a second value of 0. The binary array may have multiple dimensions. In particular, the binary array may have two dimensions (in which case, the array may be referred to as a binary matrix or logical matrix), or three dimensions (i.e., a binary cube). More dimensions are also possible.

A database is an organized collection of data. Data stored in the database may be considered structured data. Data stored in an individual field of the database may be referred to as a data value. Relationships in the database may be defined using tuples and/or relations. Accordingly, relationships exist between data values stored in the same relation.

Access control data may specify one or more actions that an entity (i.e., subject) can perform on a resource (i.e., object). Privileges may indicate the actions that are allowed. The privileges may be specified in the form of permissions. For example, the access control data may specify that a subject (e.g. a user) has a privilege (e.g. read permission) allowing the subject to read an object (e.g. a file).

A network service may be provided by a server component running on at least one computer and accessed via a network by client components. The server component and client components may run on different computers or the same computer. The network service may be implemented as a web service, accessible using hypertext transfer protocol (HTTP).

DETAILED DESCRIPTION

The subject matter described in this application can be implemented as a method or on a device, possibly in the form of one or more computer program products. Such computer program products may cause a data processing apparatus to perform one or more techniques described in the application.

The subject matter described in the application can be implemented in a data signal or on a machine readable medium, where the medium is embodied in one or more information carriers, such as a CD-ROM, a DVD-ROM, a semiconductor memory, or a hard disk.

In addition, the subject matter described in the application can be implemented as a system including one or more processors, and a memory coupled to the processors. Each of the processors may include one or more cores, each core having one or more processing units. The memory may encode one or more programs to cause the processors to perform one or more methods described in the application. Further separate matter described in the application can be implemented using various machines.

Details of one or more implementations are set forth in the exemplary description and drawings that follow. Other features will be apparent from the description, the drawings, and from the claims.

In the following text, a detailed description of examples will be given with reference to the drawings. It should be understood that various modifications to the examples may be made. In particular, one or more elements of one example may be combined and used in other examples to form new examples.

FIG. 1 shows an architecture of a database management system (DBMS) 101. The DBMS 101 may be in-memory and/or relational. The DBMS 101 may be columnar (i e column oriented). The DBMS 101 may support transactions having one or more of the following properties: atomicity, consistency, isolation, durability (ACID). In particular, the DBMS 101 may support ACID transactions, as opposed to merely supporting basically available, soft state and eventual consistency (BASE) transactions. Specifically, the DBMS 101 may provide immediate consistency as opposed to eventual consistency. The DBMS 101 may support structured query language (SQL), particularly queries including joins (e.g., natural joins, inner joins, outer joins). The DBMS 101 may be an implementation of SAP HANA, e.g., as described in "The SAP HANA Database—An Architecture Overview", Franz Färber, et al., 2012.

The DBMS 101 may be executed on a computer system (one or more computers, each of which may have multiple physical cores, and possibly multiple logical cores) having an operating system (e.g., a Unix variant, such as Linux).

The term "in-memory" may mean that data stored in databases managed by the DBMS 101 is available and stored in main memory (volatile memory, such as RAM, cache memory, data buses), which avoids the performance penalty of disk I/O or network access. Further, data and/or code (e.g., library functions) may also be stored in main memory in order to facilitate parallelization. Either magnetic disk or solid-state drives may be used for permanent persistency, e.g., in case of a power failure or some other catastrophe. The DBMS 101 may support both row and column storage and may be optimized for column storage, e.g., via dictionary compression. Use of dictionary compression may reduce the number and/or size of database indices and enable data to be loaded into the cache of a processor faster.

Parallel processing may be particularly efficient in the context of column order storage. Specifically, with data stored in column order storage, operations on single columns, such as searching or aggregations, can be implemented as loops over an array stored in contiguous memory locations. Further, since data stored in column order storage is already vertically partitioned, search and aggregation operations on one column out of multiple columns can be assigned to different processor cores. In other words, if multiple search or aggregation operations are being performed on a single column out of multiple columns, each one of the search or aggregation operations can be assigned to a different core or a different central processing unit (CPU).

The DBMS 101 includes various components, particularly a scheduler 103. The scheduler 103 may be implemented as described in "Task Scheduling for Highly Concurrent Analytical and Transactional Main-Memory Workloads", Iraklis Tsaroudakis, et al. Further, the scheduler 103 may include modifications as described in "Extending Database Task Schedulers for Multi-Threaded Application Code", Florian Wolf, et al. The scheduler 103 may cooperate with a scheduler of the operating system. In the context of the present application, various operating systems may be used. In particular, a Unix based operating system such as Linux or free BSD may be used. However an alternative such as Windows server is also possible. The operating system may support multi-threading, particularly simultaneous multi-threading such as hyper-threading.

The operating system may also support processor affinity, e.g., binding a thread to a CPU or core, or excluding a CPU from being addressed by the operating system scheduler.

For example, in the context of the Linux operating system, the command ISOLCPUS may be used to prevent worker threads from being executed on a CPU. Other commands could also be used to limit the worker threads available to execute tasks on the computer system.

A "worker thread" may be a thread under the control of the scheduler 103. For example, a pool of worker threads may be employed to process tasks of a workload. The tasks may be stored in task queues for processing by the worker threads. Such an approach may facilitate prioritization of tasks and assignment of tasks for processing according to characteristics of the workload. Such characteristics may include tasks that need access to the same data, tasks that require relatively limited CPU resources (e.g., simple online transaction processing (OLTP) tasks), tasks that require extensive CPU resources (e.g., complex OLTP or Online Analytic Processing (OLAP) tasks).

The DBMS 101 may include a connection and session management component 105. The connection and session management component 105 may include receiver threads for handling incoming queries in order to bundle the queries into tasks for the scheduler 103. The DBMS 101 may include access interfaces 107 for use by applications that connect to the DBMS 101. The DBMS 101 may further include a calculation engine 109, and an optimizer and plan generator 111.

Analytical queries and other complex operations may be processed within an execution engine 113. Also, main memory storage engines may be provided, including a row store 115 suitable for OLTP dominant workloads, a column store 117 suitable for workloads dominated by OLAP and for mixed workloads, a graph engine 119 and a text engine 121. A persistent layer 123 may be provided for logging, recovery, and page management. In some cases, I/O operations such as savepoints are only done periodically and in the background to minimize disruption to performance of the DBMS 101.

The DBMS 101 also includes an authorization component 125 to handle user access control. A transaction manager 127 may use multi-version concurrency control. Accordingly, thread local storage (i.e., storage usable by threads managed by the DBMS 101) may be used to store transactional details of queries according to multi-version concurrency control, which may be used by the transaction manager 127. The transaction manager 127 may implement snapshot isolation. A metadata manager 129 may be implemented as a repository of data describing tables and other data structures, some of which may be stored in the row store 115, the column store 117, the graph engine 119, or the text engine 121. Queries and other requests may be received via a network 131.

Figure 2:
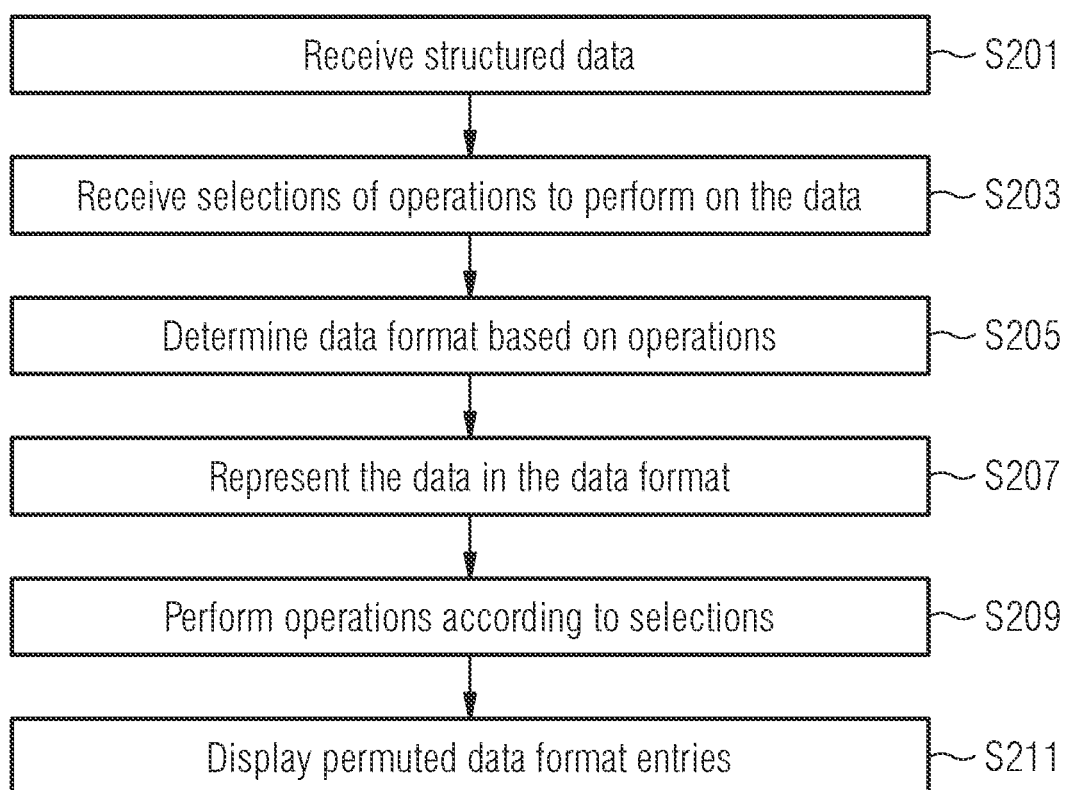
FIG. 2 is a flow diagram illustrating a method for analyzing structured data, according to one embodiment.

FIG. 2 shows a method according to an embodiment. In particular, FIG. 2 shows a method for facilitating analysis of structured data.

At step S201, structured data may be received from one or more databases. The database(s) may be managed by a DBMS, such as the DBMS 101. Although a single database is referred to below in the interest of conciseness, it should be understood that multiple databases may be used. The structured data may comprise data values and may specify relationships among the data values. The structured data may also have a semi-structured format, such as extensible markup language (XML) or JavaScript Object Notation (JSON). In case the data is semi-structured, the database may be implemented as a repository of files holding the semi-structured data.

Structure of the structured data may be implemented according to a data model, or more specifically a database model. Examples of database models are a hierarchical model, a network model, a relational model, and an object model. The structured data may be multi-dimensional in the sense that it is received from a data warehouse that categorizes facts and measures.

The database may be implemented as a relational database. Accordingly, the relationships may be specified according to relations and keys of the relational database. The structured data may be tabular in the sense that it is retrieved from the relational database and is organized in the form of tuples or rows having attributes. The relational database may be a columnar (i e column oriented) database, where data can be stored in single column tables or multi-column tables.

Further, each of the data values may be associated with an attribute. For example, data from a first column of the relational database may have a first attribute and data from a second column of the relational database may have a second attribute. The relationships among the data values may be specified among data values associated with different attributes. For example, data values in the same tuple or row of the relational database may be considered to have a relationship.

Step S203 may comprise receiving selections of operations to be performed on the structured data and an order of the operations. The operations may include at least one permutation operation. For example, the operations may be made available for selection as network services (e.g., web services). In other words, the operations may be implemented as network services and may be made available as draggable nodes or icons that can be selected and ordered in a graphical user interface (GUI), such as a web browser. The GUI may be implemented as the UI 411, discussed in connection with FIG. 4 below. In particular, data-driven documents may be used to make the operations available as draggable nodes (e.g., icons that can be clicked on and moved from one place to another using a pointing device). For example, data-driven documents may be such as the D3 visualization library by Mike Bostock.

The operations may also be made available for selection within a GUI other than a web browser or made selectable using means other than nodes or icons. For example, a list of numbers corresponding to the operations may be displayed and the user may select the operations and the order of operations by specifying a subset (e.g. a proper subset) of the numbers.

The operations may be mathematical or transformation operations. At least one of the operations is a permutation operation. The permutation operation may involve arranging the structured data into a sequence or order. For example, sorting and clustering may be considered permutation operations. In some embodiments, the operations are permutation operations. In other cases, operations may be performed that are not permutation operations. For example, one of the operations may be to identify outliers among the entries of the graphically displayable data format.

The operations may be implemented as a software-implemented function. The software-implemented functions may be stored as part of the DBMS.

The software-implemented functions may be made available as network services, as discussed above. The software-implemented functions may be executable as a single worker thread. More specifically, each of the software functions may be spawned in an individual worker thread and executed on a CPU. The worker threads executing the software functions may be managed by the scheduler 103. The CPU may be a physical central processing unit or a physical core of a central processing unit. In addition, the CPU may be a logical core, e.g., made available via the implementation of simultaneous multi-threading (e.g. hyper-threading) on a physical core.

The software-implemented functions may be implemented in the DBMS and may be implemented in the same programming language as other library functions made available on the DBMS. For example, the software functions and other library functions on the DBMS may be implemented in C++ programming language.

Accordingly, the software functions may be called directly on the DBMS and can also be called as network services from outside the DBMS. Because they are executed within their own worker threads, the software functions may be efficiently executed in parallel on the DBMS. The execution of the software-implemented functions may be particularly efficient when the computer system of the DBMS has multiple CPUs (e.g., via multiple computers, multiple cores or both). The efficiency is also made possible via implementation of the software functions in the same programming language as other library functions implemented on the DBMS. For this reason, the software functions can be made available in primary memory (e.g., RAM) without the performance penalty incurred by disk I/O.

Each software function may be implemented as a building block, such that the software function includes the same wrapper functionality as all the other software functions. In other words, each software function includes a similar interface, so that the software function can be managed as a node and called from a central manager. This may result in a modular design.

It may be a problem to call the software-implemented functions in parallel, since the functions may try to access or change the same memory location, potentially causing corrupted data. Accordingly, the software functions may be implemented with one or more synchronization primitives, e.g., a locking mechanism such as a mutex.

A subset of the operations and an order of the operations in the subset may be suggested, e.g., based on machine learning. In particular, some portion or proper subset of the operations along with their order may be determined according to machine learning techniques. This order may then be displayed for selection by a user, possibly along with a complete list of available operations that could be performed on the structured data. The user can then decide whether to make a selection of operations and an order of the operations based on the suggestion, or to disregard the suggestion.

For example, the following operations may be exposed via an open data layer:
 a) sorting according to Euclidean distance,
 b) sorting according to rectilinear distance,
 c) cluster detection,
 d) access control improvement identification.

The operations listed above could be run in various sequences. For example, referring to the letters a), b), c) and d) above, possible sequences might be as follows: a-b-c-d, b-a-c-d, b-a-b-c. Some sequences might not give meaningful results. Sequences likely to give meaningful results could be identified via machine learning techniques.

The user may be required to select at least two of the operations.

Different operations may be displayed depending on a type of the structured data. The operations above may be appropriate for access control data. Other operations could be displayed for other types of data.

At step S205 a graphically displayable data format may be determined based on the selections of the operations. The graphically displayable data format may also be determined based on a type of the structured data. In particular, both the selections of operations and the type of the structured data may influence the determination of data format. In some cases, the graphically displayable format may be determined via machine learning. For example, when the data type is access control data, the graphically displayable data format may be a binary matrix, i.e., a binary array having two dimensions.

The binary array having at least two dimensions may be determined by default. In other words, if no other data format can be matched to the selected operations and/or the type of the structured data, the binary array may be determined. The binary array may have two dimensions in a default configuration. However, additional dimensions may be appropriate for some data types or selections of operations, e.g., some assessments.

At step S207, the received structured data and the relationships among the data values of the structured data may be represented in the graphically displayable data format. The graphically displayable format may be implemented as a binary array. More specifically, the graphically displayable format may be a two dimensional binary array, i.e., a binary matrix. The following steps continue with the specific example of the binary matrix as a graphically displayable format. However, other graphically displayable formats are possible, particularly, a binary array with just one dimension or more than two dimensions (e.g., a binary cube). Further, other suitable formats are possible, such as a plot graph, 2D or 3D bubbles, a tree graph, a bar chart, a scatter graph, a pie chart, a bar chart or another visual representation.

Each of the entries of the binary matrix may specify whether a relationship between two of the data values exists. Each entry of the matrix may have one of two values. For example, the two values may be {0,1}. In another example, the two values may be {TRUE, FALSE}. Thus, each of the entries of the matrix may have either a first value or a second value. The first value may be 0 and the second value may be 1.

The first value may specify that a relationship between two of the data values exists and the second value may specify that the relationship does not exist (or vice versa). Accordingly, the relationships specified in the structured data are represented in the binary matrix.

The binary matrix may have significantly more entries than there are data values. For example, given a set of relational data values, the binary matrix may have a row for each distinct data value in a first column of the set. The binary matrix may also have a column for each distinct value in a second column of the set. Accordingly, given five distinct data values in the first column, the binary matrix has five rows. Further, given seven distinct values in the second column, the binary matrix has seven columns.

At step S209, operations may be performed according to the selections and the order. In other words, the selected operations may be performed in the specified order. For example, when a user selects operations and the order of operations via the web browser, the operations selected by the user are then performed in step S207. The example below refers to the binary matrix. However, it should be understood that other types of graphically displayable data format may be used. Further, a binary array having a different number of dimensions may be used.

Bringing the entries of the binary matrix into the logical order by permuting the entries may involve sorting or clustering the entries. Partial sorting or partial clustering could also be performed. In particular, certain entries of the binary matrix having a particular characteristic may be grouped together while other entries of the matrix are left untouched. Permuting may also involve simply rearranging the matrix entries in a different way without sorting or clustering. In conjunction with further manipulations of the matrix, such as zooming in to a portion of the matrix or coloring various values, such permuting may facilitate data analysis, particularly in order to identify ways to improve the security of a computer system, as discussed in connection with FIG. 3.

Maintaining the relationships between the matrix entries may involve ensuring that row and column correspondence is maintained. For example, if column 3 of row 3 of the matrix indicates that a relationship between two of the data values exists, the matrix should continue to indicate that the relationship exists between the two data values after permuting the entries of the matrix.

The term "permuting" may refer to performing a permutation operation. Permutation operations may include sorting the matrix and clustering entries of the matrix. The operations may also include manipulating the matrix without permuting the matrix entries. For example, the operations may include identifying outliers among the entries of the matrix.

Sorting the matrix may be performed in various ways. In particular, the sorting may be carried out according to Euclidean distance or rectilinear distance. More particularly, the matrix may be sorted according to the Euclidean or rectilinear distance between vectors of one of the dimensions of the matrix. For example, sorting according to the Euclidean distance may involve sorting vertical vectors (columns) in order to minimize the Euclidean distance between two neighboring vectors.

The operations may include clustering the entries of the matrix. In particular, there may be multiple selectable clustering operations and it may be possible for the user to select one or more or only one of the clustering operations. Each of the clustering operations may correspond to a different clustering algorithm. The clustering algorithms may be connectivity based or centroid based. More particularly, the clustering algorithms may be one or more of the following: k-means, average-linkage, single-linkage. Other types of clustering algorithms, e.g. hierarchical clustering, may also be used.

In some cases, the structured data may be access control data. The access control data may include a plurality of subjects and a plurality of privileges. In other words, the data values of the structured data may include subjects and privileges. Accordingly, the relationships among the data values may be relationships among the subjects and the privileges. In the binary matrix, the relationships may be represented by specifying whether one of the subjects has a privilege. For example, one of the relationships specifies that subject user A has privilege B, which may mean that user A has read permission with respect to a text file stored on the computer system.

Accordingly, a first dimension of the matrix may represent the subjects and a second dimension of the matrix may represent the privileges. For example, rows of the matrix may represent subjects and columns of the matrix may represent privileges. Each of the entries of the matrix may have either a first value or a second value. The first value may specify that a subject corresponding to the first dimension has been assigned a privilege corresponding to the second dimension, and the second value may specify that the subject has not been assigned the privilege. The method may further comprise identifying an access control improvement based on the logical order of the entries.

The privileges may comprise roles for role based access control. Each role may be assigned a set of privileges. The first value may indicate that the subject has been assigned the role. The privileges may include permissions with respect to an object or resource. The permissions may include read, write, and execute. More specifically, a privilege may be a permission with respect to an object, e.g., permission to write to the object.

Subjects may be users, groups of users, processors, or machines.

The access control improvement may be privilege consolidation, or identification of an outlying privilege and a privileged subject. The combination of the "outlying privilege" and the "privileged subject" may identify a matrix entry that is an outlier with respect to a cluster of four or more matrix entries (including at least 2 distinct privileges and 2 distinct subjects), for which each of the subjects has all of the privileges.

Privilege consolidation may involve grouping or aggregating privileges. For example, in privilege consolidation, multiple privileges may referred to using a single role. Privilege consolidation may also involve consolidation of roles.

The outlying privilege and the privileged subject may correspond to one of the entries in the binary matrix. In particular, the outlying privilege and the privileged subject may correspond to an outlier among the entries.

The privilege consolidation may comprise identifying one of the clusters of entries, wherein the identified cluster indicates that a plurality of privileges have each been assigned to multiple subjects. Privilege consolidation may further comprise identifying a role that can be assigned to the plurality of privileges.

The identification of an outlying privilege and a privileged subject may comprise identifying one of the clusters of entries, wherein the identified cluster includes a plurality of privileges, each of the privileges being assigned to multiple subjects, wherein each of the subjects is assigned all of the privileges in the identified cluster. In addition, a privileged subject that is assigned an outlying privilege may be identified. The privileged subject may be assigned a proper subset of the privileges in the cluster, wherein the proper subset includes the outlying privilege. In some cases, the outlying privilege is the only privilege in the cluster that is assigned to the privileged subject.

Privilege consolidation may improve security of the computer system by reducing the number of privileges that need to be managed. This may make it easier to identify users that have the wrong privileges and to assign the proper privileges to new users.

Identification of an outlying privilege and a privileged subject may improve security by helping ensure that users are not assigned privileges that they should not have. In particular, it may be the case that a user should only be assigned all privileges in a group of privileges or none of the privileges in the group. Identifying a user having just one privilege from the group of privileges or a proper subset of the privileges in the group of privileges may lead to the discovery of unauthorized access and thereby improve the security of the computer system.

Step S211 may comprise displaying the entries of the graphically displayable format (e.g., binary array) for analysis after performing the operations.

One or more of the steps above may be executed by at least one processor.

The method described above may be embodied in a computer program product. The product may be tangibly embodied on a non-transitory computer readable storage medium and comprise instructions that, when executed by at least one processor, cause the processor to carry out the method steps discussed above.

The method steps discussed above may also be embodied in a system. The system may include instructions recorded on a non-transitory computer readable medium and executable by at least one processor. The system may comprise a database storing structured data, a GUI (e.g., a web browser), and an application server (e.g., a web server). The application server may be implemented as the XS Layer 405 described in the context of FIG. 4. The database may be managed by the DBMS 101 discussed above.

Figure 3:
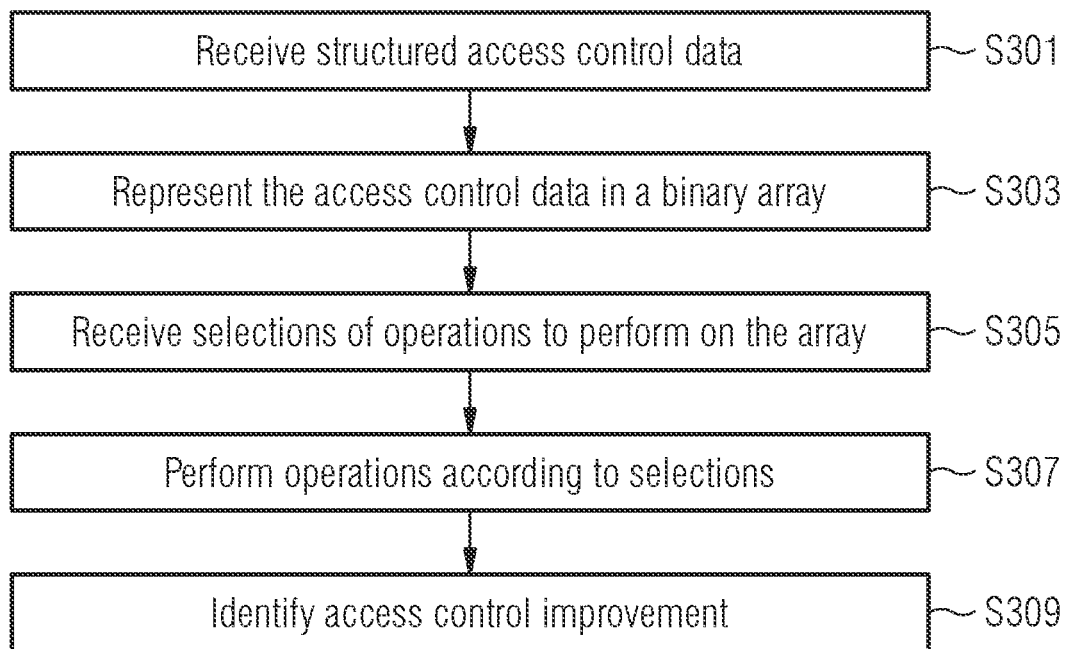
FIG. 3 is a flow diagram illustrating a method for identifying ways to improve the security of a computer system, according to one embodiment.

FIG. 3 describes a more specific implementation of the features discussed with respect to FIG. 2. In particular, FIG. 3 shows a computer-implemented method for identifying ways to improve the security of a computer system, particularly by facilitating analysis of access control data of the computer system. Unless otherwise indicated, the steps discussed in connection with FIG. 3 may be used in the method of FIG. 2, and vice versa.

In the example of FIG. 3, the graphically displayable data format of FIG. 2 is determined to be a binary array. Accordingly, a step corresponding to S205 (determining the graphically displayable data format) is omitted with respect to the description of FIG. 3. Another difference is that the step of representing the structured data in the binary array is performed before the operations are selected. The representing step could also be performed after the selections of operations are received, as discussed in connection with FIG. 2. In this case, the operations would be selected for performance on the structured data (e.g., after the structured data has been represented in the binary array). Further, unless otherwise indicated, the steps discussed in connection with FIG. 2 are also applicable with regard to the method of FIG. 3, and vice versa.

Step S301 may comprise receiving structured access control data for the computer system from a database. The database may be managed by a DBMS, such as the DBMS 101. The access control data may relate to the computer system executing the DBMS 101 or a different computer system. The access control data may be for data stored in a database managed by the DBMS. The access control data may include a plurality of subjects, a plurality of privileges and relationships among the subjects and the privileges.

Step S303 comprises representing the access control data and the relationships in a binary array. In the example, the binary array has two dimensions and is referred to as a binary matrix, however, the binary array may have one dimension or more than three dimensions (binary cube). Step S303 may be triggered via interaction with a network service (e.g., a web service). Interaction with network services is discussed in more detail below.

Accordingly, a first dimension (e.g., rows) of the binary matrix may represent the subjects and a second dimension (e.g., columns) of the binary matrix may represent the privileges. The first dimension may be rows of the matrix and the second dimension may be columns of the matrix. Accordingly, a subject corresponding to the first dimension may be represented by a single row of the binary matrix and a privilege corresponding to the second dimension may be represented by a single column of the binary matrix.

Each of the entries of the binary matrix may specify whether a relationship between a subject and a privilege exists. Moreover, each of the entries of the binary matrix has either a first value or a second value. The first value may specify that a subject corresponding to the first dimension has been assigned a privilege corresponding to the second dimension, and the second value may specify that the subject has not been assigned the privilege. For example, the first value may be 1 and the second value may be 0. Alternatively, the first value may be TRUE and the second value may be FALSE. Other values are also possible. However, it may be that entries in the binary matrix are exclusively limited to either the first value or the second value.

Step S305 may comprise receiving selections of operations to be performed on the binary matrix and in order of the operations. The operations may include permutation operations. In particular, the operations may be made available for selection by a user. The user may be required to select at least two of the operations. The operations may be made available as draggable nodes corresponding to software functions. In particular, the D3 visualization library by Mike Bostock may be used to make the operations available as draggable nodes.

The software functions may be implemented as network services. Accordingly, the user may select and drag the desired nodes (i.e. icons or visible shapes in a user interface) in order to indicate the operations to be performed and the order of the operations. The permutation operation may involve bringing the entries of the binary matrix into a logical order while maintaining the relationships among the data values represented in the entries. In one example, each node selectable by the user represents a network service encapsulating one of the operations.

Permutation operations may include sorting entries of the binary matrix according to Euclidean distance, sorting entries of the binary matrix according to rectilinear distance, clustering entries of the matrix. Sorting the binary matrix according to the Euclidean or rectilinear distance may comprise sorting vectors of one of the dimensions of the binary matrix (e.g., sorting columns) according to the corresponding distance between the vectors. The clustering may involve grouping entries having the first value.

The operations may also include identifying outliers in the entries of the binary matrix.

Step S307 may comprise performing operations according to the selections. The performing may include permuting entries of the binary matrix. The permuting may comprise bringing the entries into a logical order while maintaining the relationships.

Clustering of entries in the binary matrix may be performed using one of multiple different clustering algorithms. In particular, it may be possible for the user to select from multiple clustering algorithms and the clustering algorithm selected by the user may be used to cluster entries of the matrix. The clustering may be connectivity based or centroid based. The algorithms may include one or more of the following: k-means, average-linkage, single-linkage.

The privileges may comprise roles for role based access control, wherein each role is assigned a set of privileges. The first value may indicate that the subject has been assigned the role. The privileges may include permissions with respect to an object or resource. The object may be part of the database or a file. The permissions may include read, write, and execute.

The subject may be one of the following: a user, a group of users, a process, a machine.

Step S309 may comprise identifying an access control improvement based on the logical order of the binary matrix entries. The access control improvement may be one of the following: privilege consolidation, or identification of an outlying privilege and a privileged subject. The outlying privilege and the privileged subject may be identified in combination. In particular, the outlying privilege and the privileged subject may correspond to a single entry of the binary matrix.

Privilege consolidation may comprise identifying one of the clusters of matrix entries, wherein the identified cluster indicates that a plurality of privileges have each been assigned to multiple subjects. The privilege consolidation may further comprise identifying a role that can be assigned to the plurality of privileges.

In the following, an example is provided showing how the method of FIG. 3 can be used for privilege consolidation. Structured data extracted from the database is shown in Table 1 below.

TABLE 1

|   | Subject | Privilege |
|---|---------|-----------|
| 1 | A | M1 |
| 2 | A | M2 |
| 3 | A | M3 |
| 4 | A | R2 |
| 5 | A | R3 |
| 6 | A | R4 |
| 7 | B | M1 |
| 8 | B | R1 |

TABLE 1-continued

| | Subject | Privilege |
|---|---|---|
| 9 | B | R3 |
| 10 | C | M3 |
| 11 | C | R2 |
| 12 | C | R3 |
| 13 | C | R4 |
| 14 | D | M1 |
| 15 | D | M2 |
| 16 | E | M3 |
| 17 | E | R2 |
| 18 | E | R3 |

The structured data of Table 1, as well as the relationships among the data values, are then represented in the following two binary matrices. In the example there are 5 distinct users (A, B, C, D, E) and 7 distinct roles (M1, M2, M3, R1, R2, R3, R4). Further, the first value, indicating that a relationship exists between user and role, is "1" and the second value, indicating that the relationship does not exist, is "0".

In both matrices, the rows are distinct users and the columns are distinct roles. The first binary matrix (Matrix 1) is an initial representation and the entries of the second binary matrix (Matrix 2) have been brought into a logical order while maintaining the relationships. Thus, Matrix 2 is derived by permuting the entries of Matrix 1 into a logical order while maintaining the relationships among data values represented in Matrix 1. More specifically, a clustering operation was performed on Matrix 1 in order to arrive at Matrix 2. The entries in Matrix 2, which are bolded and correspond to entries in lines 1, 2, and 3, for columns 2, 3, and 4, forming a square of entries, are a cluster of nine entries having the first value.

| 1 | 1 | 1 | 0 | 1 | 1 | 1 |
|---|---|---|---|---|---|---|
| 1 | 0 | 0 | 1 | 0 | 1 | 0 |
| 0 | 0 | 1 | 0 | 1 | 1 | 1 |
| 1 | 1 | 0 | 0 | 0 | 0 | 0 |
| 0 | 0 | 1 | 0 | 1 | 1 | 0 |

Matrix 1

| 0 | 1 | 1 | 1 | 0 | 0 | 0 |
|---|---|---|---|---|---|---|
| 1 | 1 | 1 | 1 | 1 | 1 | 0 |
| 1 | 1 | 1 | 1 | 0 | 0 | 0 |
| 0 | 0 | 0 | 1 | 0 | 1 | 1 |
| 0 | 0 | 0 | 0 | 1 | 1 | 0 |

Matrix 2

The cluster of nine entries in Matrix 2 is in rows 1-3 (rows counting from 1 to 5) and columns 2-4 (columns counting from 1 to 7).

The identification of an outlying privilege and a privileged subject may comprise identifying a cluster of entries of the binary matrix including multiple privileges and multiple subjects, wherein each of the subjects is assigned all of the privileges in the cluster. The identification may further comprise identifying a privileged subject that is assigned an outlying privilege, wherein the privileged subject is assigned a proper subset of the privileges in the cluster and the proper subset includes the outlying privilege. In some cases, the outlying privilege is the only privilege in the cluster that is assigned to the privileged subject. In other words, the proper subset of the privileges in the cluster may be limited to the outlying privilege.

The identification of the outlying privilege and the privileged subject may improve the security of the computer system in the following way. In particular, there may be certain privileges that should only be assigned to a subject as a group (i.e., all of the privileges should be assigned or none of them should be assigned). Accordingly, identifying a situation in which only one of these privileges has been assigned to a subject and the others have not been assigned to the subject may indicate that the subject has unauthorized access. Identifying and eliminating this unauthorized access may improve the security of the computer system.

The steps discussed above may be implemented in a computer program product comprising computer readable instructions. The instructions, when loaded and executed on a computer system, cause the computer system to perform operations according to a combination of the steps discussed above.

The steps discussed above may also be implemented in a computing system. The computing system may be configured for identifying ways to improve the security of a computer system. The computing system may comprise a database, and an application server (e.g., a web server). The database may be configured to store structured access control data for the computer system. The database may be managed by the DBMS 101. The application server may be configured to perform a combination of the steps discussed above.

Figure 4:
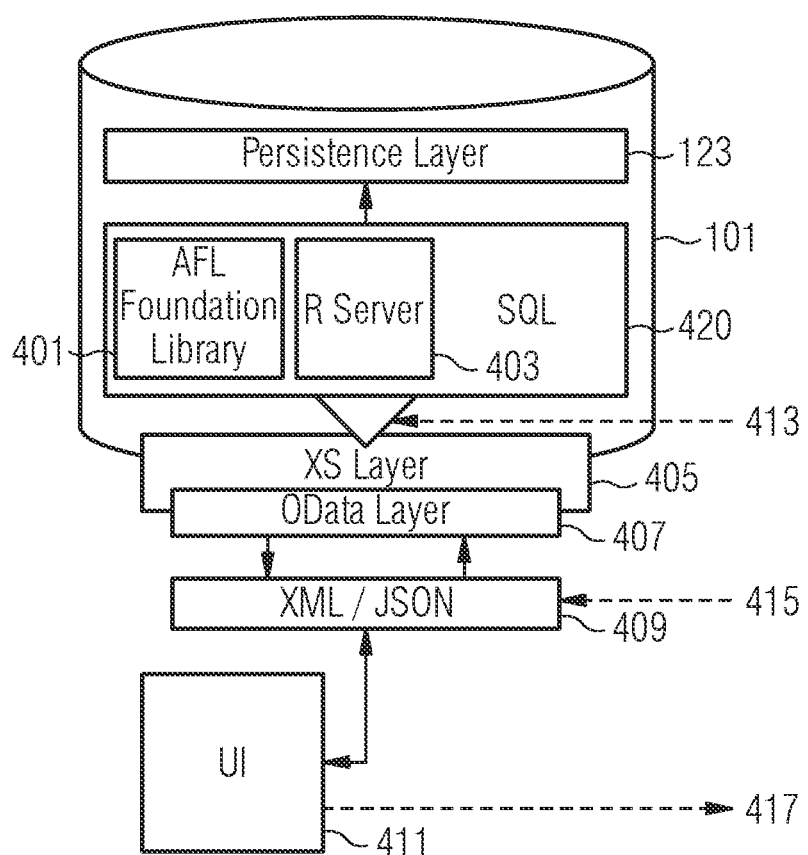
FIG. 4 is a block diagram illustrating an exemplary architecture of a system according to some embodiments.

FIG. 4 is a block diagram illustrating an exemplary architecture of a system according to some embodiments. FIG. 4 illustrates a DBMS, such as the DBMS 101, to be used in relation to a method for facilitating analysis of structured data, such as the described methods in relation to FIG. 2 and FIG. 3. The access interface at FIG. 4 is an SQL access interface 420, such as the access interfaces 107 at FIG. 1. The SQL access interface 420 include library functions AFL Foundation Library 401 and a statistical computing and graphics server, the R Server 403. In a specific example, the library functions 401 are implemented as the application function library foundation (AFL) of SAP HANA. The statistical computing and graphic server is implemented as the R server of SAP HANA. However, other implementations are possible.

Also depicted are the XS Layer 405 (including a web server) and an interface for using the open data protocol—an OData Layer 407. Accordingly, the open data protocol facilitates the creation of representational state transfer (REST) web services for accessing functionality in the access interface 420 via the application server 405. For example, exemplary web services might have the following Uniform Resource Locators (URLs):
https://exampleAccount.int.sap.hana.ondemand.com/rest.iagfoundation/createMatrix
https://exampleAccount.int.sap.hana.ondemand.com/rest.iagfoundation/sortMatrix The application server at XS Layer 405 may be implemented as SAP HANA extended application services (XS). However, other implementations are possible.

Draggable nodes corresponding to web services made available through the layers 405 and 407 can be exposed via an XML flow document in the XML/JSON layer 409. The draggable nodes may be implemented using D3, as discussed above. The selection and ordering of the nodes may cause changes to the XML flow document. The draggable nodes may be manipulated from within a user interface (UI) 411. The UI 411 may be implemented as a web browser.

Accordingly, operations to be performed on the binary matrix may be implemented as software functions in the SQL access interface layer 420. These software functions may be executed as worker threads by the scheduler 103 as discussed above. The software functions may be exposed from the SQL access interface 420 at 413. The software functions may be referred to as modular processing functions (because they are easily reusable) or thread building blocks (because they are executable within a single thread).

By means of the application server XS Layer 405, the Open Data protocol (OData Layer) 407 and the XML/JSON layer 409, the software functions are exposed as draggable nodes that can be manipulated in the UI 411. Accordingly, after operations are performed on the binary matrix according to the selections of the user, the entries of the matrix are provided for analysis to the user at 417.

Figure 5:
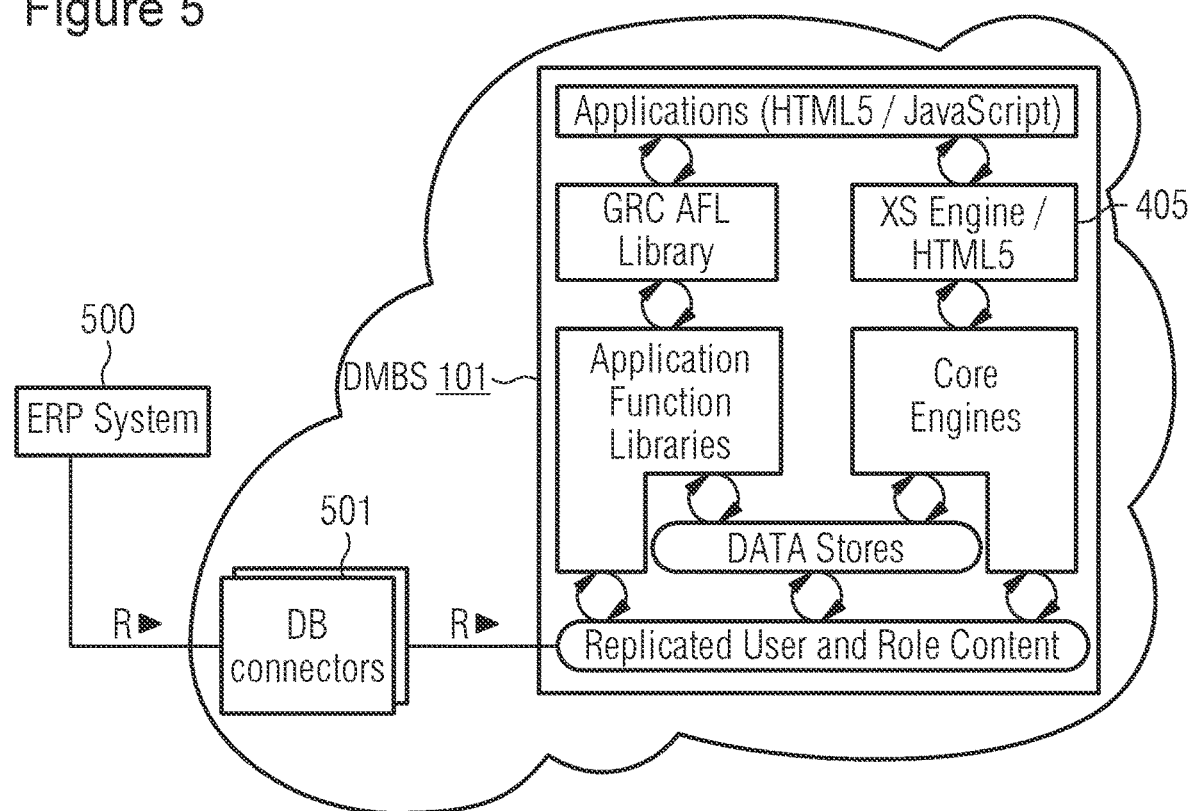
FIG. 5 is a block diagram illustrating an architecture of the system according to some embodiments.

FIG. 5 shows the DBMS 101 including software functions, the application server XS Engine 405 and various other components. The DBMS 101 is connected to an enterprise resource planning (ERP) system 500 via database (DB) connectors 501. The database connectors 501 may provide proxy and additional software support for connecting to the ERP system 500. The structured data may be received from the ERP system 500 before it is received from the database and processed in the DBMS 101.

Figure 6:
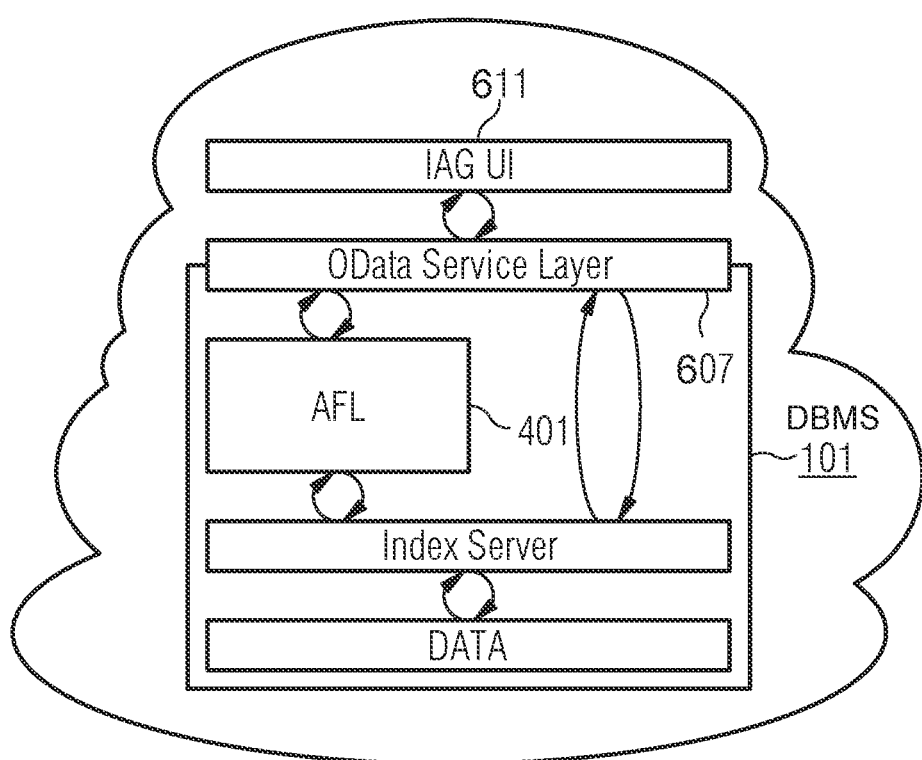
FIG. 6 is a block diagram illustrating an architecture of the system according to some embodiments.

FIG. 6 shows yet another depiction of the DBMS 101 including the library functions AFL 401. FIG. 6 illustrates an OData Service Layer 607, such as the discussed OData layer 407 in FIG. 4. FIG. 6 also illustrates a UI 611 (such as the UI 411), which associated with the DBMS 101.

Figure 7:
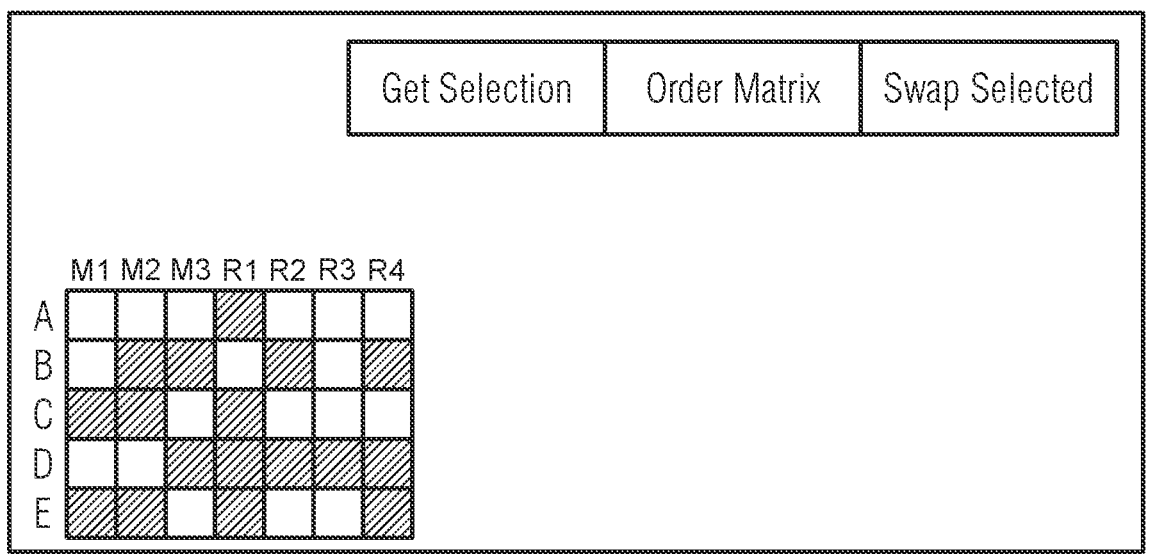
FIG. 7 is a block diagram illustrating access control data and relationships among subjects and privileges represented in a binary matrix, according to one embodiment.

FIG. 7 shows access control data and relationships among subjects and privileges in a binary matrix, according to one embodiment. A first dimension represents the subjects A, B, C, D, E. A second dimension represents the privileges M1, M2, M3, R1, R2, R3, R4. More specifically, the y-axis shows users and the x-axis shows assigned roles. An entry in the matrix is white if a relationship between a subject and a privilege exists, and has a first hatching (diagonal lines from the upper right of a square extending to the lower left of the square) if the relationship does not exist. In particular, an entry is white if the user corresponding to the role has been assigned the privilege corresponding to the column and hatched if the user corresponding to the role has not been assigned the privilege corresponding to the column.

Hatching is used in the drawings for convenience. In a computer implementation, colors could be used instead of hatchings. For example, green could be used to indicate a relationship exists and black used to indicate that the relationship does not exist.

Figure 8:
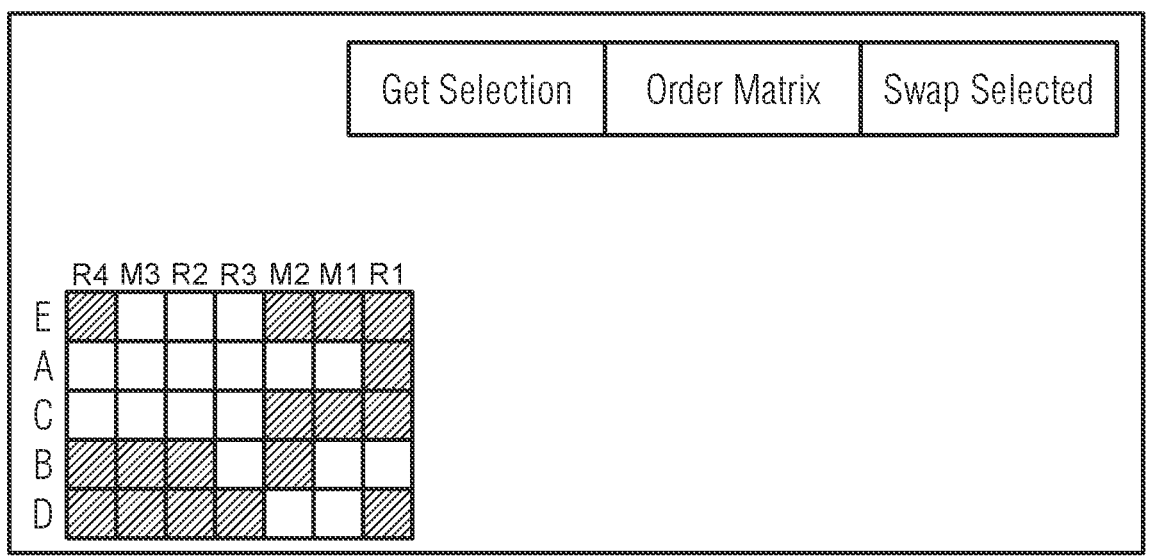
FIG. 8 is a block diagram illustrating a binary matrix after performing selected operations, according to one embodiment.

FIG. 8 is a block diagram illustrating a binary matrix after performing selected operations, according to one embodiment. The binary matrix may be the binary matric of FIG. 7 after receiving selections of operations to be performed on the matrix and performing operations according to the selections. In the specific example, the operations include sorting and clustering. The cluster consists of the nine entries in rows E, A, and C as well as columns M3, R2, and R3.

Figure 9:
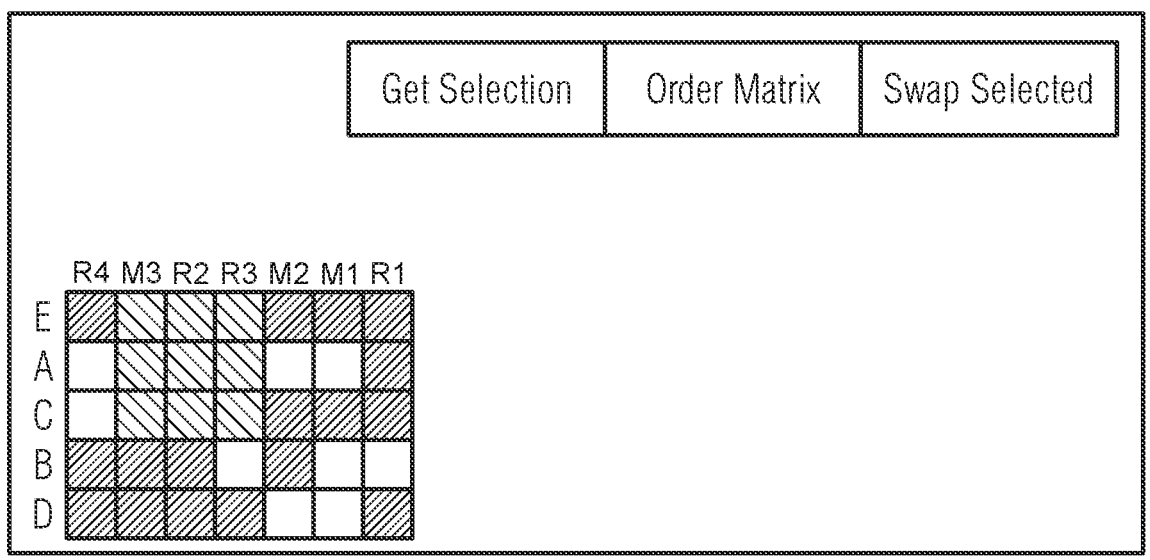
FIG. 9 is a block diagram illustrating a binary matrix in which an access control improvement has been identified based on a logical order of the matrix entries, according to one embodiment.

FIG. 9 is a block diagram illustrating a binary matrix in which an access control improvement has been identified based on a logical order of the matrix entries, according to one embodiment. FIG. 9 shows identification of an access control improvement. In particular, the access control improvement is privilege consolidation. According to the example, the cluster of entries mentioned in the context of FIG. 8 has been identified and indicated by displaying the cluster using a second hatching. In contrast to the first hatching, in the second hatching the lines are further apart and lines extend from the upper left corner of a square to the lower left corner of the square. As mentioned above, the cluster consists of the nine entries in rows E, A and C and columns M3, R2, and R3. Accordingly, role 1 may be identified and assigned to privileges M3, R2, and R3. The privileges may be consolidated in the sense that rather than assigning the three privileges M3, R2, and R3 to each of the three users, each of the three users can simply be assigned role 1. This may facilitate management of the privileges M3, R2 and R3 for existing users, ease assignment of the privileges to new users and thereby improve security of the computer system.

Figure 10:
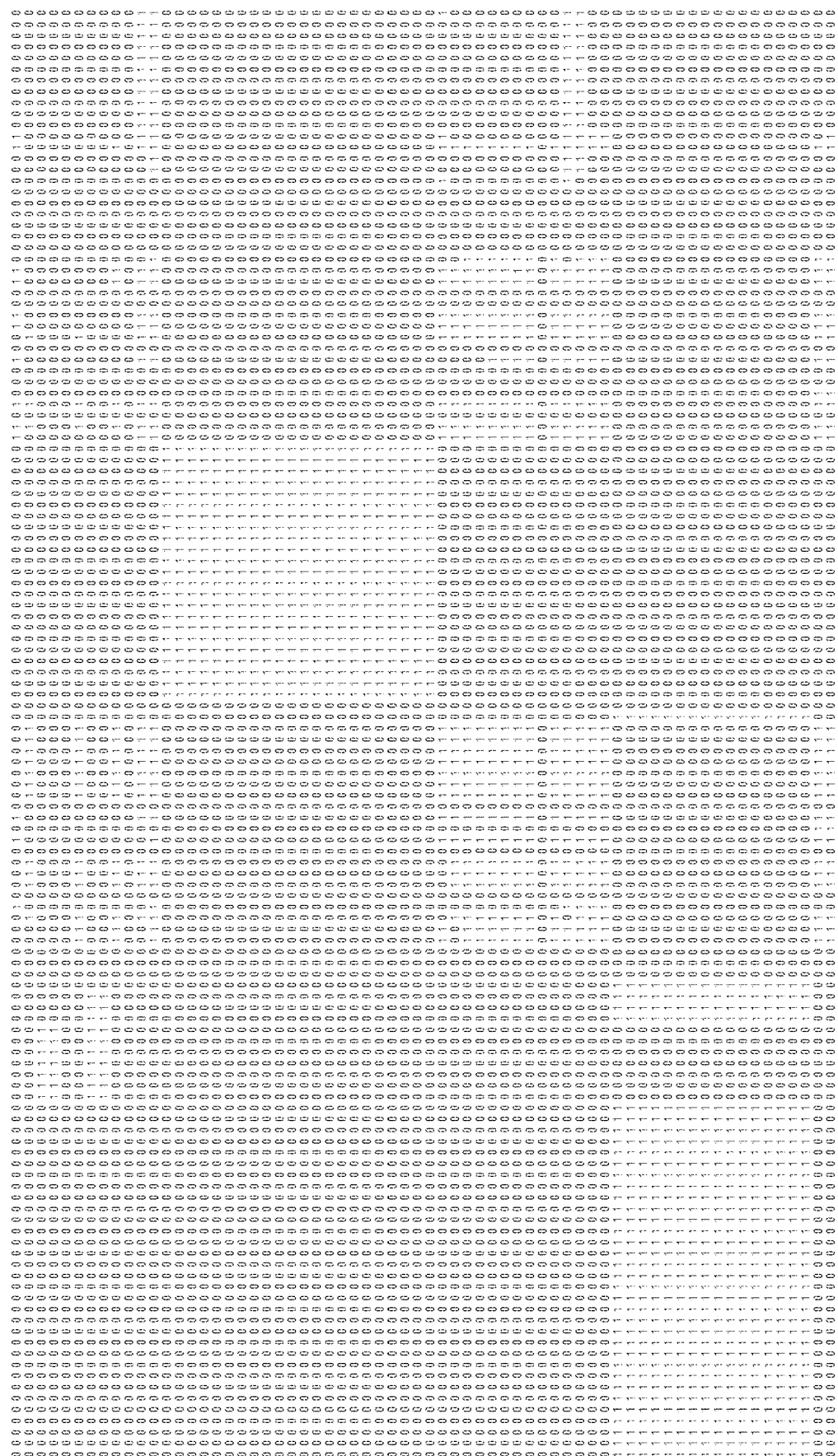
FIG. 10 is a block diagram illustrating a binary matrix, according to one embodiment.

FIG. 10 shows another binary matrix including clusters of entries.

Figure 11:
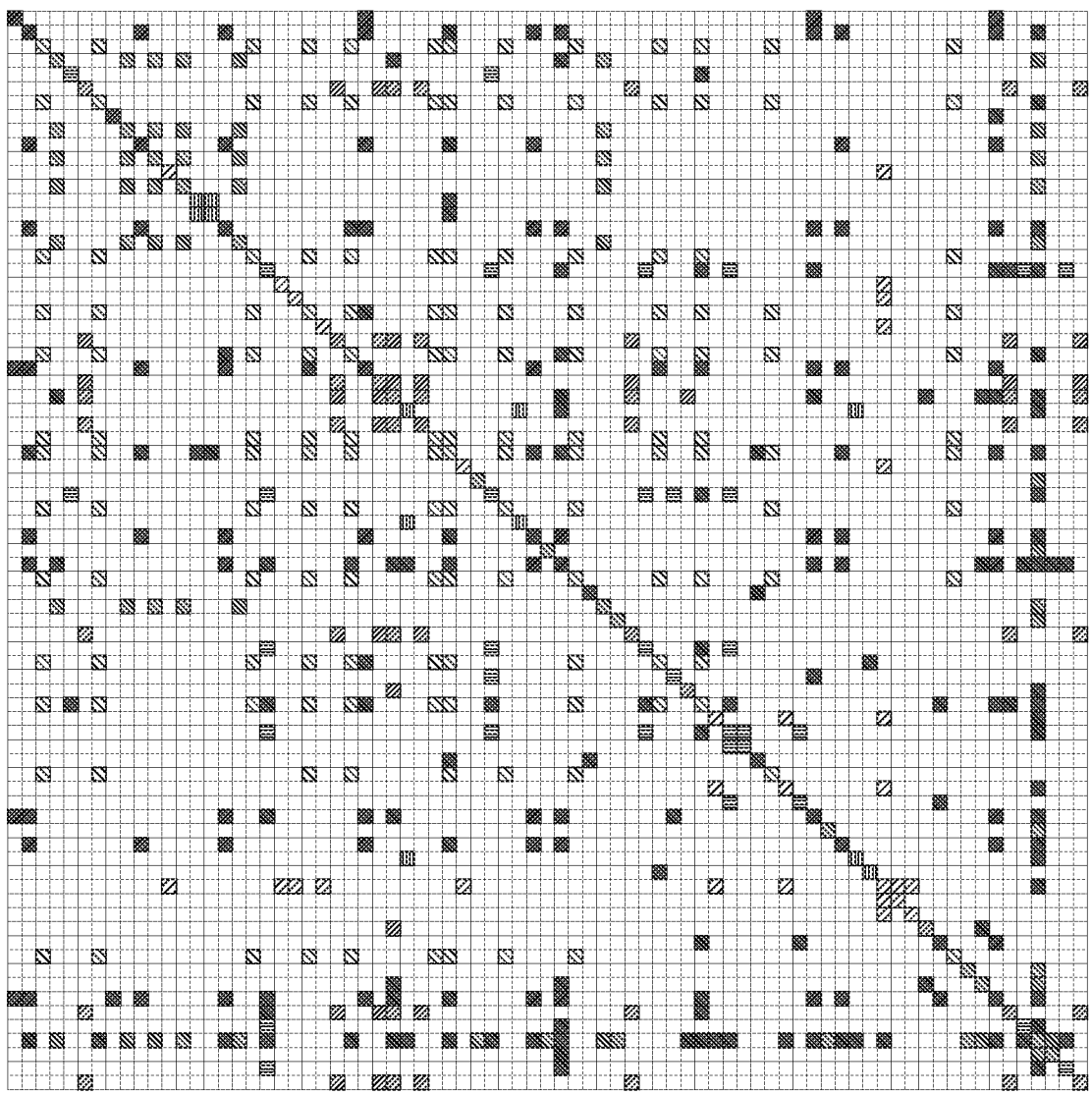
FIG. 11 is a block diagram illustrating a matrix of hatchings in which entries having a first value are hatched differently, according to one embodiment.

FIG. 11 shows a matrix of hatchings representing access control data and relationships among subjects and privileges of the access control data. The matrix of FIG. 11 may be generated using a binary matrix similar to the binary matrix of FIG. 10. Entries of the matrix of hatchings indicating that relationships exist have been hatched differently in the figure for ease of viewing. Entries without hatching indicate that no relationship exists. In a computer based implementation, the matrix entries could be colored rather than hatched.

Figure 12:
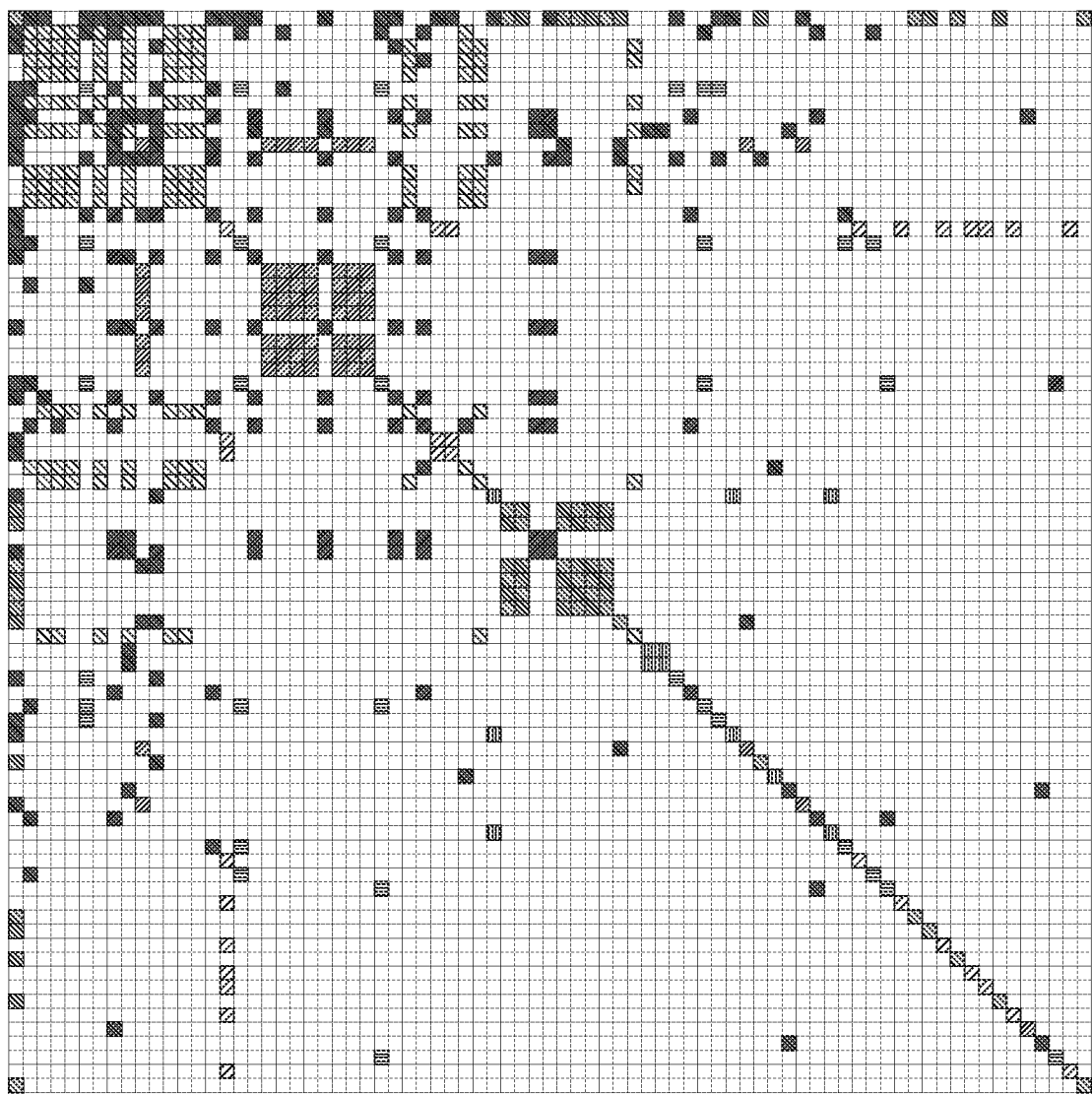
FIG. 12 is a block diagram illustrating the matrix of FIG. 11 after permuting entries of the matrix by sorting them, according to one embodiment.

FIG. 12 shows the matrix of FIG. 11 after performing a sorting operation. In the example, both rows and columns have been sorted according to Euclidean distance.

Figure 13:
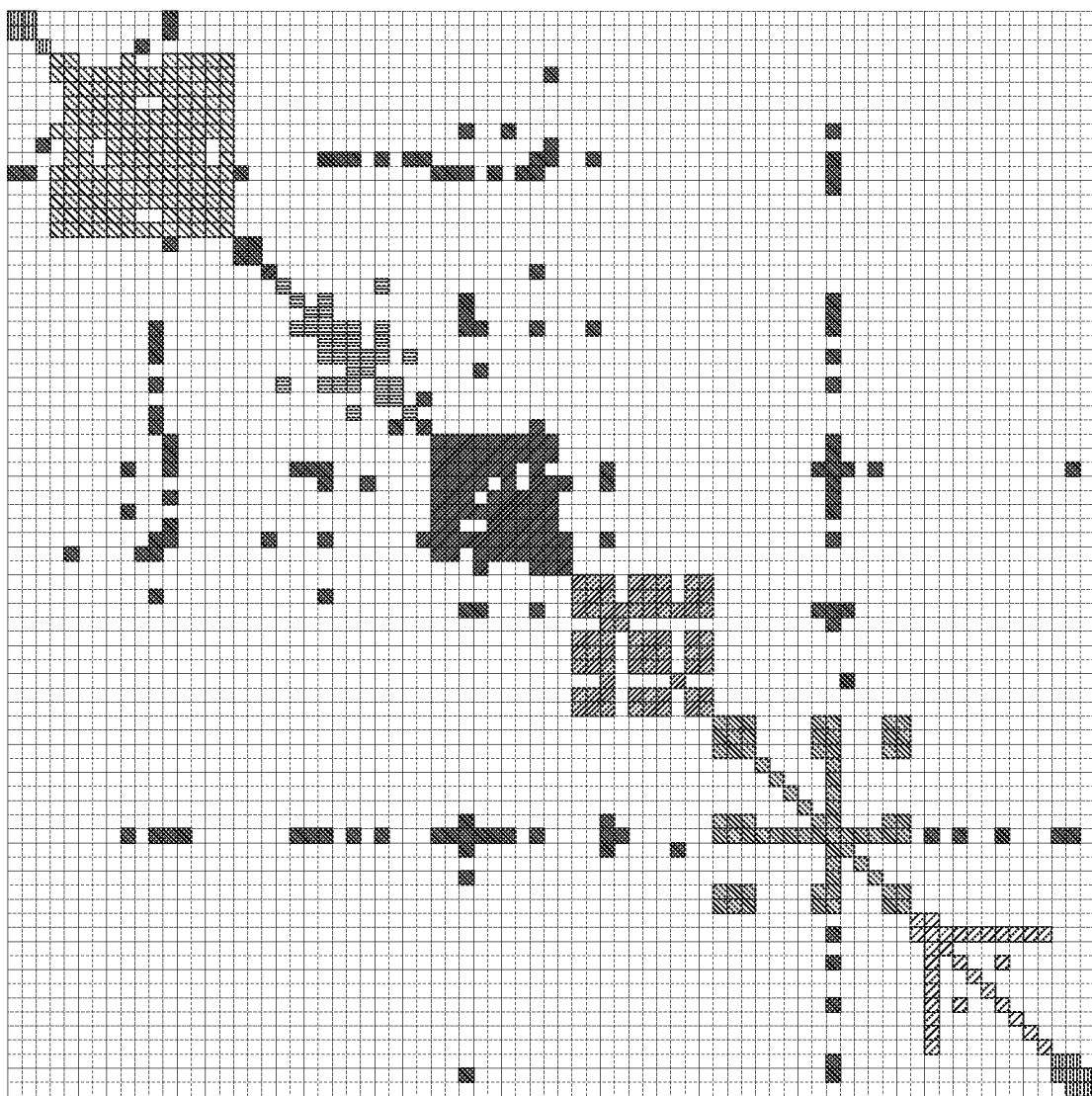
FIG. 13 is a block diagram illustrating the matrix of FIG. 12 after a clustering operation, according to one embodiment.

FIG. 13 shows the matrix of FIG. 12 after performing a clustering operation.

In a computer based implementation, different colors could be used to represent different clusters, just as different hatchings are used for different clusters in the figure.

According to one example in which a D3 implementation is used, identified clusters may be colored via the following method presented in Table 2, where "count" is the total cluster number:

TABLE 2

```
var getDiverseColorByMaxCount = function(count)
{
var hslMax = 360;
var segment = hslMax / count;
var colors = [ ];
for(var i = 0; i < count; ++i) {
  var c = segment * i;
  colors[i] = 'hsl(' + c + ', 100%, 50%)';
}
return colors;
};
```

What is claimed is:

1. A computer-implemented method, the method comprising:
   receiving structured data from a database, the structured data comprising data values and relationships among the data values, wherein a value of the data values is associated with an attribute, wherein the relationships are specified among data values associated with different attributes;
   receiving selections of a plurality of operations to be performed on the structured data and a sequential order of performing the plurality of operations, wherein the plurality of operations include at least one permutation operation;
   determining a graphically displayable data format based on the selections of operations;
   representing the structured data and the relationships among the data values in the graphically displayable data format;

performing operations according to the selections, including, permuting entries of the graphically displayable data format, wherein the permuting comprises bringing the entries of the graphically displayable data format into a logical order while maintaining the relationships; and displaying the entries for analysis after performing the operations.

2. The method of claim 1, wherein the graphically displayable format is a binary array having at least two dimensions, wherein an entry of the entries of the binary array specifies whether a relationship between two of the data values exists, and wherein the entry has a value selected from the group consisting of a first value and a second value, the first value specifying that the relationship between the two of the data values exists, and the second value specifying that the relationship does not exist.

3. The method of claim 1, wherein the structure of the structured data is associated with a database model, wherein the structured data is tabular, and where the database is a columnar database in which data is stored in column tables.

4. The method of claim 1, wherein the database is a relational database, wherein the relationships are specified via relations and keys of the relational database.

5. The method of claim 1, wherein, prior to receiving the selections, the operations are made available for selection as network services, and
wherein the operations are made available such that the order of the operations is selectable through dragging the operations to form a sequence.

6. The method of claim 1,
wherein an operation from the operations is implemented as a software function of an in-memory database management system of a computing system, and
wherein the operation is implemented within a single thread executable on a processing unit of the computing system in parallel with other threads executable on the same or on different processing units of the computing system.

7. The method of claim 6, wherein the graphically displayable format is a binary array having at least two dimensions, and the method further comprises:
sorting the binary array according to a distance measure which is selected from the group consisting of an Euclidean distance and a rectilinear distance;
clustering entries of the binary array; and identifying outliers in the entries.

8. The method of claim 7, wherein sorting the binary array comprises sorting vectors of one of the dimensions of the binary array according to a distance value based on the distance measure computed between the vectors.

9. The method of claim 7, wherein the clustering is performed using a clustering algorithm selected from a group of multiple different clustering algorithms consisting of k-means, average-linkage, and single-linkage.

10. The method of claim 1, further comprising:
suggesting, before receiving the selections, a subset of the operations and a suggested order of the operations in the subset based on machine learning.

11. The method of claim 1, wherein the structured data is access control data and the graphically displayable format is a binary array having at least two dimensions,
wherein the access control data includes a plurality of subjects and a plurality of privileges,
wherein a first dimension of the binary array represents the subjects and a second dimension of the binary array represents the privileges, wherein the entries of the binary array are selected from a group consisting of a first value and a second value, wherein the first value specifies that a subject corresponding to the first dimension has been assigned a privilege corresponding to the second dimension, and the second value specifies that the subject has not been assigned the privilege; and
wherein the method further comprises identifying an access control improvement based on the logical order of the entries.

12. The method of claim 11, wherein the privileges comprise roles for role based access control, wherein a role from the roles is assigned with a set of privileges, and wherein the first value indicates that the subject has been assigned to the role.

13. The method of claim 11, wherein the privileges include permissions with respect to a resource, and wherein the permissions include read, write, and execute.

14. The method of claim 11, wherein the access control improvement is selected from the group consisting of:
privilege consolidation, and
identification of an outlying privilege and a privileged subject.

15. The method of claim 14, wherein the privilege consolidation comprises:
identifying one of the clusters of entries, wherein the identified cluster indicates that a plurality of privileges have each been assigned to multiple subjects; and
identifying a role that can be assigned to the plurality of privileges.

16. The method of claim 14, wherein the identification of the outlying privilege and the privileged subject comprises:
identifying a cluster of entries including multiple privileges and multiple subjects, wherein a subject of the multiple subjects is assigned to the privileges in the cluster; and
identifying a privileged subject from the multiple subjects, wherein the privileged subject is assigned to the outlying privilege, and wherein the privileged subject is assigned a proper subset of the privileges in the cluster, wherein the proper subset includes the outlying privilege.

17. The method of claim 16, wherein the outlying privilege is uniquely assigned to the privileged subject.

18. A computer program product tangibly embodied on a non-transitory computer-readable storage medium and comprising instructions that, when executed by at least one hardware processor, cause the hardware processor to:
receive structured data from a database, the structured data comprising data values and specifying relationships among the data values, wherein a value of the data values is associated with an attribute, wherein the relationships are specified among data values associated with different attributes;
receive selections of a plurality of operations to be performed on the structured data and a sequential order of performing the plurality of operations, wherein the plurality of operations include at least one permutation operation;
determine a graphically displayable data format based on the selection of operations;
represent the structured data and the relationships among the data values in the graphically displayable data format;
perform operations according to the selections, including, permuting entries of the graphically displayable data format, wherein the permuting comprises bringing the entries of the graphically displayable data format into a logical order while maintaining the relationships; and display the entries for analysis after performing the operations.

19. A system including instructions recorded on a non-transitory computer-readable medium and executable by at least one processor, the system comprising:

a hardware processor;

a database to store structured data;

a graphical user interface (GUI);

an application server to:

receive structured data from the database, the structured data comprising data values and specifying relationships among the data values, wherein a value of the data values is associated with an attribute, wherein the relationships are specified among data values associated with different attributes;

receive selections of a plurality operations to be performed on the structured data and a sequential order of the plurality of operations, wherein the plurality of operations include at least one permutation operation;

determine a graphically displayable data format based on the selection of operations;

represent the structured data and the relationships among the data values in the graphically displayable data format;

perform operations according to the selections, including, permuting entries of the graphically displayable data format, wherein the permuting comprises bringing the entries of the matrix into a logical order while maintaining the relationships; and send the entries to the GUI for display and analysis after performing the operations; and the GUI to receive and display the entries.

20. The method of claim 1, wherein maintaining the relationships further comprises:

ensuring that a row and a column correspondence is maintained between entries of the graphically displayable data format after the permuting of the entries.

* * * * *